2,775,718

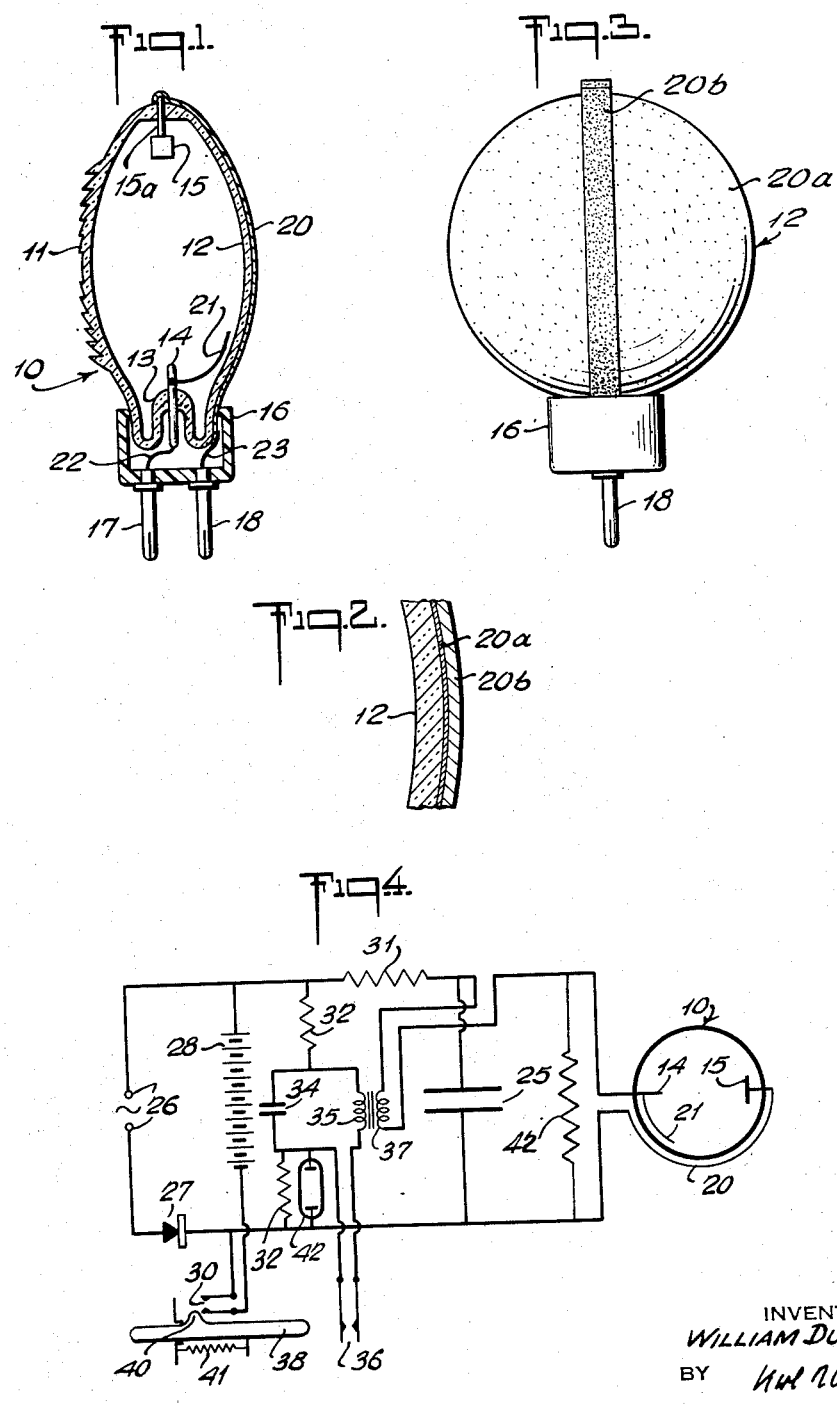

ELECTRONIC SPEED LIGHT

William Dubilier, New Rochelle, N. Y.

Application March 4, 1954, Serial No. 414,200

4 Claims. (Cl. 313—113)

The present application is a continuation-in-part of my application Serial No. 408,340, filed February 5, 1954, now abandoned entitled Electronic Speed Light.

The present invention relates to electronic speed lights or repeating flash units of the type synchronized with a camera shutter for taking photographic pictures.

Repeating flash tubes have many advantages, compared with both flood lights and expendable flash bulbs, aside from the increased economy where large numbers of pictures are to be taken.

Among the major advantages of repeating flash tubes are an increased sharpness of the pictures due to the short flash duration or exposure time, being of the order of one five-hundredth to one one-thousandth of a second for ordinary photographic purposes, as well as the fact that the flash produced has a low temperature and is practically unnoticeable and easy on the subject.

The use of electronic flash tubes for average photographic and amateur purposes has, however, been greatly impeded in the past, both by the relatively high cost of the flash units, where only a relatively small number of pictures is to be taken, as well as by the size and bulk of the units and accessory equipment, including the power source, converters, reflectors, etc.

Accordingly, an object of the present invention is the provision of a simple and low cost repeating flash tube, especially suitable for use in portable units for amateur and average photographic purposes.

A further object is the provision of a simplified and reliable power supply and control circuit suitable for use in connection with flash tubes of the type according to the invention.

These and ancillary objects, as well as novel aspects of the invention, will be better understood from the following detailed description taken in reference to the accompanying drawing, forming part of this specification and wherein:

Fig. 1 is a cross-section through a repeating flash tube constructed in accordance with the principles of the invention;

Fig. 2 is an enlarged fractional portion of Fig. 1, showing in greater detail the construction of the reflecting and current conducting layers upon the outside of the tube;

Fig. 3 is a rear view of the tube of Fig. 1, showing a modification of the current conducting and reflecting layers; and Fig. 4 is a wiring diagram of a power supply and control circuit suitable for use in connection with flash tubes of the type shown by Fig. 1.

Like reference numerals denote like parts in the different views of the drawing.

Referring to Fig. 1, there is shown at 10 an envelope or bulb consisting of glass or an equivalent insulating material and composed of a pair of outwardly vaulted or convexly curved front and rear portions 11 and 12, respectively, joined at their lower end by an in-turned press 13 which serves as a mount or support for a first rod-shaped discharge electrode 14 hermetically sealed therein, in the manner shown. Mounted opposite to the electrode 14, near the upper end or apex of the tube, is a cooperating discharge electrode 15 supported by a mounting and connecting rod 15a also hermetically sealed in the tube. The latter is suitably mounted upon an insulating base 16 consisting preferably of a synthetic plastic material and being provided with a pair of terminal or connecting prongs 17 and 18 for removably inserting the tube in a flash unit. Before sealing, the inside of the tube is exhausted and filled with a suitable inert gas of adequate pressure, such as xenon or a suitable mixture of gases, commonly used in photographic flash tubes of this type.

According to the present invention, the rear portion 12 of the tube is coated on its outside surface with a metallic layer 20 serving as a mirror or reflector, to confine the light produced by the discharge to an angle corresponding to the field angle of the average photographic camera (about 50°). In addition, the layer 20, being in contact connection with the outer end of the supporting rod 15a, serves as a connector for conducting operating current to the electrode 15. For this purpose, the layer 20 advantageously comprises an inner relatively thin partial layer 20a, Fig. 2, of silver or other suitable metal serving as a mirrored surface of high reflectivity and being coated with an outer and heavier layer 20b of any suitable conducting material, to act as a conductor for the electric current.

While the reflecting layer 20a covers the entire rear portion 12 of the bulb, the conducting layer 20b may be of narrow or strip shape of adequate thickness to efficiently conduct the current to the electrode 15, as more clearly shown in Fig. 3. The layers 20a and 20b may be produced by means of any known method, preefrably by applying a solution or paint of silver oxide and subsequent reduction to pure silver by heating to a proper elevated temperature. Alternatively, the layers may be applied by a spraying method using finely-divided particles in molten or disintegrated condition, to provide both a mirrored surface of high reflecting power and a conductor of low resistivity for carrying the discharge current of the tube.

Numerals 22 and 23 indicate suitable connecting leads between the electrode 14 and the metal layer 20 to the connecting prongs 17 and 18, respectively, mounted in the base 16. If desirable a separate reflector may be used in which case the rear wall 12 is provided with a current conducting strip or layer 20b only. Furthermore, the reflector may also be in the form of a metal layer applied to the inside surface of the rear wall 12.

In the operation of flash tubes of this type, the operating voltage is substantially below the breakdown voltage for effecting a gaseous discharge or flash between the electrodes 14 and 15. In order to start or initiate the discharge, there is provided within the tube an auxiliary starting electrode 21, directly connected, in the example shown, to the electrode 14 and extending a short distance in a direction parallel to the rear wall 12, as shown in the drawing. The purpose of the starting electrode 21 is to cause an auxiliary high frequency discharge to ionize the gas within the tube to an extent sufficient to initiate the main discharge or flash between the electrodes 14 and 15. Since, according to conventional practice, the operating voltage is supplied from a charged condenser, the discharge will be in the form of a short flash having a duration depending upon the capacity and operating voltage. The starting of the flash by a high frequency discharge has the advantage of eliminating a separate starting electrode upon the outside of the tube and special circuit connections, as well as the usual high voltage ignition coil employed in conventional electronic flash devices.

Furthermore, only a relatively weak high frequency current is required, thus minimizing deterioration of the synchronizing contacts and increasing the reliability of the flash discharge.

According to an improved feature, the front portion 11 of the tube is constructed in the form of a so-called Fresnel lens, as shown in the drawing in an exaggerated fashion, to uniformly distribute the light produced by the discharge over the entire effective angle and to prevent "hot spots" within the illuminated area. Alternatively, the Fresnel lens may be a separate unit sealed onto or mounted upon the front of the tube, in a manner well understood.

Fig. 4 shows a simplified wiring diagram of an electronic flash unit suitable for use in connection with a flash tube of the type described. A charging condenser 25 of relatively high capacity, practically as high as 1000 mmfd., is shown connected in a conventional manner to an alternating current source indicated by the terminals 26 in series with a rectifier 27. Alternatively, the condenser may be directly connected to a battery or equivalent direct current source 28 by closing a switch 30 which may be a separate manually operated switch or operated by and synchronized with the camera shutter release, as described in greater detail hereafter. Item 31 is a limiting resistance of suitable value connected in series with the power source and condenser 25, to permit the proper charging of the condenser and to provide sufficient protection for the flash tube.

The direct current source 28 may be in the form of a high voltage dry battery, or it may comprise a low voltage battery, a vibrator converter to change the direct current into alternating current and a transformer and rectifier to produce a high voltage direct current suitable for charging the condenser 25, in a manner well known to those skilled in the art.

The flash tube 10 illustrated schematically and being of the type according to Fig. 1, is connected to the condenser 25 in series with the secondary winding of a high frequency transformer having a primary winding 35 inserted in a starting or triggering circuit also connected to the direct current source and comprising a pair of limiting resistors 32 and 33 and a triggering condenser 34 of relatively low capacity, practically from 0.1 to 0.2 mmfd., all connected in series. Condenser 34 is temporarily shunted by the primary winding 35 of the high frequency transformer upon closing of the synchronizing contacts 36 of the camera shutter.

In operation, connection of the unit to the alternating power source 26 or closing of the switch 30 for operation by the battery 28, causes a charging of the condenser 25 according to an exponential curve, to the full operating voltage, the latter being however insufficient to initiate a breakdown between the electrodes 14 and 15 of the tube 10. At the same time, the starting condenser 34 is charged through the resistors 32 and 33. Upon subsequent actuation of the shutter, the synchronizing contacts 36 are closed temporarily at the instant of full shutter opening. As a result, the condenser 34 is discharged through the primary winding 35 in the form of a high frequency oscillation which in turn induces a high frequency current in the secondary winding 17, whereby to cause a high frequency discharge to pass between the starting electrode 21 and the outer electrode or coating 20 and to ionize the gas in the neighborhood of the electrode 14 to an extent sufficient to initiate the main discharge or luminous flash through the tube.

A direct or continued discharge through the tube by the power source is prevented by the resistance 31 limiting the current to a value insufficient to sustain the discharge. As a result, as the condenser 25 discharges through the tube 10, upon closing of the contacts 36, the discharge or flash will be extinguished automatically when the potential of the condenser has decreased below the extinction potential of the tube. Accordingly, the duration and intensity of the flash is determined solely by the energy stored in the condenser 25. After the discharge, the condenser is immediately recharged by the power source through the resistance 31 so as to be ready for the next flash or operating cycle.

While the main discharge electrodes 14 and 15 have been shown with relatively small and large areas, the former preferably forming the cathode and the latter the anode, respectively, two rod-shaped electrodes may be provided, as will be understood. Furthermore, the starting electrode 21 may be connected to and mounted near the cathode, to reduce the cathode drop or to increase the voltage gradient at the cathode by the high frequency discharge. Alternatively, the electrode 21 may be connected to and mounted near the anode or between both electrodes, to produce a high frequency ionizing discharge through the gas reducing the impedance of the tube sufficiently to initiate the flash or main discharge through the tube.

In the case of battery operation, in order to prevent a prolonged connection and exhaustion of the battery 28 by the condenser 25, especially in case of an electrolytic condenser having a high leakage current, the switch contacts 30, normally being a separate and manually operated switch, may be controlled or synchronized with the operation of the shutter release 38 shown in the form of a plunger and provided with a cam or projection 40 adapted to close the contacts 30. The plunger 38 is biased by a return spring 41, in such a manner that, upon initial operation, the cam 40 causes a closing of the switch contacts, to connect the battery 28 to and charge the condenser 25. The plunger 38 is held in this position until the condenser has been charged to the full battery voltage, as indicated by a ready light 42. The latter consists of a simple two-element gas discharge tube connected across the resistor 33 in the triggering circuit.

Continued operation of the plunger results in a closing of the synchronizing contacts 36 and flashing of the tube. During the return movement of the plunger by the spring 41, the switch contacts are closed only momentarily, thus preventing any appreciable charge of the condenser 25. If desirable, however, the switch 30 may be in the form of a snap or toggle switch, closing or opening its contacts by operation, respectively, during the forward and return movement of the plunger 38 by the projection or cam 40. In this case, the battery will be fully disconnected during the return movement of the shutter release. According to an improved feature, the plunger may be provided with an intermediate click stop arrangement, defining a fixed charging position and preventing overshooting and closing of the triggering contacts 36 before the condenser 25 has been charged to the full operating voltage.

The shutter release 38 and switches 30 and 36 need not necessarily be mounted upon the camera, but may be embodied or mounted in the flash unit, a flexible cable uniting the plunger 38 with the cable release socket of a conventional camera shutter.

A further resistance 42 of high value is shown connected directly across the tube 10 or condenser 25, to cause a full discharge of the condenser after disconnection from the power source or to dissipate any residual charge applied during the return movement of the release 38 by a synchronized battery switch of the type shown in Fig. 4.

The various parts of the complete unit may be mounted in an insulating casing provided with a socket for the flash tube and a flexible wire for connection to the synchronizing contact of a standard camera shutter. Furthermore, suitable means may be provided for removably mounting the unit upon a camera, such as through the conventional tripod socket, accessory clip, or in any other suitable manner.

In the foregoing the invention has been described with reference to a specific device. It will be evident, however, that numerous modifications and variations, as well as the substitution of equivalent elements for those shown herein for illustration, may be made without departing from the broader scope and spirit of the invention as defined in the appended claims. The specification and drawing are accordingly to be regarded in an illustrative rather than in a limiting sense.

What I claim is:

1. An electronic flash tube comprising a gas-filled envelope, a pair of electrodes at opposite ends of said envelope defining a luminous discharge path, said envelope having an outwardly vaulted portion adjacent to said discharge path, a metallic light reflecting coating upon the outside of said vaulted portion, to confine light produced by the discharge to a predetermined spreading angle, a pair of connecting terminals exterior of said tube adjacent to one of said electrodes, and means to connect one of said terminals to the adjacent electrode and to connect the other terminal to said other electrode through said coating.

2. An electronic flash tube comprising a gas-filled envelope, an anode and a cathode within said envelope defining a luminous discharge path therebetween, said envelope having an outwardly vaulted portion adjacent to said discharge path, a metallic light reflecting coating upon the outside of said vaulted portion, to confine light from said tube to a predetermined spreading angle, said coating being conductively connected to said anode, a starting electrode within said envelope connected to said cathode and extending partly parallel to the inside wall of said envelope opposite to said coating, a pair of connecting terminals exterior of said tube, means to connect one of said terminals to said cathode and to connect the other terminal to said coating.

3. An ionic flash tube comprising a gas-filled envelope constituted by a pair of opposed shell-like front and rear portions, a pair of internal electrodes disposed at diametrically opposed ends of said envelope, a metallic light reflecting coating upon said rear portion to confine light produced by the discharge to a predetermined spreading angle, a pair of connecting terminals exterior of said tube adjacent to one of said electrodes, and means to connect one of said terminals to the adjacent electrode and to connect the other terminal to the other electrode through said coating.

4. In an electronic flash tube comprising a gas filled envelope, a pair of electrodes at opposite ends of said envelope defining a luminous discharge path, said envelope having an outwardly vaulted portion adjacent to said discharge path, a relatively thin light reflecting coating overlying substantially the entire outer surface of said vaulted portion, to confine light produced by said discharge to a predetermined spreading angle, a pair of connecting terminals exterior of said tube adjacent to one of said electrodes, a second relatively thick strip-like conductive coating overlying said first coating and extending from one to the other of said electrodes, and means to connect one of said terminals to the adjacent electrode and to connect the other terminal to said other electrode through said strip-like coating.

References Cited in the file of this patent

UNITED STATES PATENTS

| | | |
|---|---|---|
| 1,517,466 | Schaller et al. | Dec. 2, 1924 |
| 1,585,252 | Lederer | May 18, 1926 |
| 1,881,619 | James | Oct. 11, 1932 |
| 2,156,068 | Ruttenauer et al. | Apr. 25, 1939 |
| 2,182,609 | Bethenod | Dec. 5, 1939 |
| 2,212,950 | Pfeilsticker | Aug. 27, 1940 |
| 2,249,672 | Spanner | July 15, 1941 |
| 2,259,040 | Inman | Oct. 14, 1941 |
| 2,498,640 | Beck | Feb. 28, 1950 |
| 2,531,220 | Kaplan | Nov. 21, 1950 |